(12) United States Patent
Ilchenko et al.

(10) Patent No.: US 6,879,752 B1
(45) Date of Patent: Apr. 12, 2005

(54) FILM SPACER FOR SETTING THE GAP BETWEEN AN OPTICAL COUPLER AND A WHISPERING-GALLERY MODE OPTICAL RESONATOR

(75) Inventors: Vladimir Ilchenko, La Canada, CA (US); Dmitri Kossakovski, South Pasadena, CA (US)

(73) Assignee: OEwaves, Inc., Pasadena, CA (US)

( * ) Notice: Subject to any disclaimer, the term of this patent is extended or adjusted under 35 U.S.C. 154(b) by 205 days.

(21) Appl. No.: 10/116,643

(22) Filed: Apr. 3, 2002

(51) Int. Cl.[7] .............................. G02B 6/26; G02B 6/42
(52) U.S. Cl. ........................................................ 385/30
(58) Field of Search ............................. 385/30, 36, 43

(56) References Cited

U.S. PATENT DOCUMENTS

| | | | |
|---|---|---|---|
| 3,753,157 A | * | 8/1973 | Ash et al. .................... 333/101 |
| 4,592,043 A | * | 5/1986 | Williams ..................... 398/79 |
| 5,064,619 A | | 11/1991 | Finlan |
| 5,095,389 A | * | 3/1992 | Yokomori ................... 359/833 |
| 5,231,533 A | | 7/1993 | Gonokami et al. |
| 5,351,127 A | | 9/1994 | King et al. |
| 5,532,493 A | | 7/1996 | Hale et al. |
| 5,652,556 A | | 7/1997 | Flory et al. |
| 5,790,583 A | | 8/1998 | Ho |
| 5,825,799 A | | 10/1998 | Ho et al. |
| 5,926,496 A | | 7/1999 | Ho et al. |
| 6,009,115 A | | 12/1999 | Ho |
| 6,016,197 A | | 1/2000 | Krivoshlykov |
| 6,103,535 A | | 8/2000 | Pilevar et al. |
| 6,251,688 B1 | | 6/2001 | Erb et al. |
| 6,278,523 B1 | | 8/2001 | Gorecki |
| 6,594,425 B2 | * | 7/2003 | Tapalian et al. .............. 385/50 |

FOREIGN PATENT DOCUMENTS

| | | |
|---|---|---|
| EP | 0 533 390 A1 | 3/1993 |
| WO | WO 01/40757 A2 | 6/2001 |
| WO | WO 01/96913 A1 | 12/2001 |
| WO | WO 02/13337 A1 | 2/2002 |

OTHER PUBLICATIONS

Steve Blair and Yan Chen "Resonant–Enchanced Evanescent–Wave Fluorescence Biosensing with Cylindrical Optical Cavities." *Applied Optics* / vol. 40, No. 4 / Feb. 1, 2001.
www.technologyreview.com/magazine/sep01/1_oewaves.asp "OEwaves—Light–wave timekeeper for Faster Networks." By Claire Tristram (Sep. 2001).
A.T. Rosenberger and J.P. Rezac "Evanescent–Wave Sensor Using Microsphere Whispering–Gallery Modes." In *Laser Resonators III*, Proceedings of SPIE vol. 3930 (2000).

* cited by examiner

*Primary Examiner*—Daniel Stcyr
*Assistant Examiner*—Lisa M. Caputo
(74) *Attorney, Agent, or Firm*—Fish & Richardson P.C.

(57) ABSTRACT

This application teaches systems and techniques that use an optical coupler and a film for evanescently coupling light to or from an optical or electro-optical device. The film is connected to the coupler surface as a spacer for setting the distance between the optical coupler and the optical or electro-optical device.

64 Claims, 10 Drawing Sheets

FILM SPACER FOR SETTING THE GAP BETWEEN AN OPTICAL COUPLER AND A WHISPERING-GALLERY MODE OPTICAL RESONATOR

STATEMENT REGARDING FEDERALLY SPONSORED RESEARCH

The systems and techniques described herein were made in the performance of work under a U.S. Government Contract No. DAAH01-02-C-R081, and are subject to the provisions of Public Law 96-517 (35 USC 202) in which the Contractor has elected to retain title.

FIELD OF THE INVENTION

The present invention relates to optical systems, and in particular, to film spacers located between an optical coupler and a whispering-gallery mode optical resonator.

BACKGROUND OF THE INVENTION

Optical resonators are exemplary electro-optical devices that are often small in size, having diameters on the order of millimeters, and may be used in many optical system applications, including optical sensors for biological and chemical compounds, electro-optical oscillators and modulators, and tunable optical filters. The optical resonators are curved optical waveguides, i.e., a cylinder, a sphere, or a toroid within which light is internally reflected at the inner surface of the resonator. Optical resonators can support resonator modes of light called whispering-gallery modes ("WGMs"), and thus, are often referred to as whispering-gallery mode resonators. WGMs occur when light having an evanescent wave component travels via internal reflection around the periphery of the optical resonator. The evanescent waves extend beyond the optical resonator's outer surface and may be coupled into an adjacent optical coupler as long as the optical coupler is located within the extent of the evanescent wave, typically on the order of the light's wavelength.

Many optical resonators which propagate whispering-gallery modes of light have extremely low transmission losses, and as a result, have a very high quality factor ("Q"). High Q optical resonators are desirable because the higher the Q, the longer the amount of time the internally reflected light will remain within the optical resonator. The ultimate intrinsic Q of the optical resonator ($Q_o$) is limited by the optical losses of the resonator material. Any practical coupling to whispering-gallery modes of the optical resonator can be accomplished through an evanescent wave from an adjacent optical element, i.e., an optical coupler.

If light from the optical coupler is over-coupled to the optical resonator, there will be broadening in the whispering-gallery mode output peak due to increased losses at the interface between the optical coupler and the optical resonator. If light from the optical coupler is under-coupled to the optical resonator, there will be less efficient energy transfer from the optical coupler to the optical resonator. Critical coupling occurs when enough energy is coupled from the optical coupler into the optical resonator to compensate for the roundtrip losses of the light propagating through the optical resonator. Coupling losses between the optical coupler and the optical resonator are exponentially dependent upon the distance d between the surface of the optical coupler and the optical resonator~exp (−d/r*), where r* is the effective scale length of evanescent field of the resonator for the excited whispering-gallery mode as expressed in the following equation:

$$r^* = \lambda / \sqrt{(4\pi(n_{res}/n_{out})^2 - 1)}$$

where $\lambda$ is the wavelength of light evanescently coupled between the optical coupler and the optical resonator;

$n_{res}$ is the index of refraction of the optical resonator; and $n_{out}$ is the index of refraction outside the surface of the optical resonator.

If the optical coupler contacts the optical resonator, too much of the light is evanescently coupled out from the optical resonator resulting in a low Q. Also, if the optical coupler is positioned far, more than three wavelengths, from the optical resonator, coupling of light between the optical resonator and the optical coupler becomes difficult. Thus, accurate positioning of the optical coupler relative to the optical resonator is critical to the efficiency of the optical system.

Optical couplers can be configured in various forms including those shown by example in FIGS. 1(a)–1(c) which include cross-sectional views, not shown to scale, of three different types of optical couplers 10, 12, and 14. In FIGS. 1(a)–1(c), each optical coupler is positioned adjacent to and spaced away from a cylindrical or spherical optical resonator 16, 18, and 20 by a distance "d", which in practice is roughly on the order of the wavelength of the light to be evanescently coupled into or out from the optical resonator. Typically, d ranges in value from approximately 0.1 to 3 times the wavelength of the light. While not shown in FIGS. 1(a)–1(c), the optical resonator also may be toroidal in shape.

FIG. 1(a) shows an optical fiber coupler 10 that includes a core 22 and a cladding layer 24. The end of the optical fiber coupler closest to the optical resonator 16 has a flat polished surface 26 through which light is evanescently coupled into and out from the optical resonator. Similarly, FIG. 1(b) shows a prism coupler 12 having a flat surface 28 through which light is evanescently coupled into and out from the optical resonator 18. Also, FIG. 1(c) shows a tapered optical fiber coupler 14, again having a core 30 and a cladding layer 32, including a tapered section 34 through which light is evanescently coupled into and out from the optical resonator 20. In FIGS. 1(a), 1(b), and 1(c), incident light travels through the optical coupler as indicated by the straight arrows A1–A3, respectively, and internally reflected light travels around the periphery of the optical resonator as shown by the curved arrows B1–B3, respectively.

Because the optical resonator and optical coupler are small in size they may be integrated within small housings or devices that can be incorporated into various optical or electro-optical systems. However, one challenge associated with mass producing such integrated optical resonator and optical coupler combinations is providing for ease and repeatability in accurately setting and maintaining the exact separation for stable and exact strength of evanescent coupling. In the experimental setting, voltage-controlled piezo-positioners can be used to finely tune the positions of the optical coupler and optical resonator. However, the use of piezo-positioners is not conducive to mass production of optical systems employing optical resonators and optical coupler combinations. Thus, there is a need for a method of accurately separating an optical coupler relative to an optical resonator while maintaining a high Q.

SUMMARY OF THE INVENTION

In one aspect of the present invention, a system includes an optical coupler and a film. The optical coupler evanescently couples light to or from an optical or electro-optical device. The optical coupler includes a coupler interface to which the film is connected.

In another aspect of the present invention, a system includes an optical coupler having a coupler surface, a film, and an optical resonator. The film is connected to the coupler surface and the optical resonator is adjacent to the film.

In another aspect of the present invention, a method of coupling light includes propagating light through an optical coupler having a coupler surface, and evanescently coupling light through a film connected to the coupler surface into an optical or electro-optical device adjacent to the film.

It is understood that other aspects of the present invention will become readily apparent to those skilled in the art from the following detailed description, wherein is shown and described only exemplary embodiments of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Various features, aspects, and advantages of the present invention will become better understood with regard to the following description, appended claims, and accompanying drawings where:

DETAILED DESCRIPTION OF THE PREFERRED EMBODIMENTS

Figure 1A:
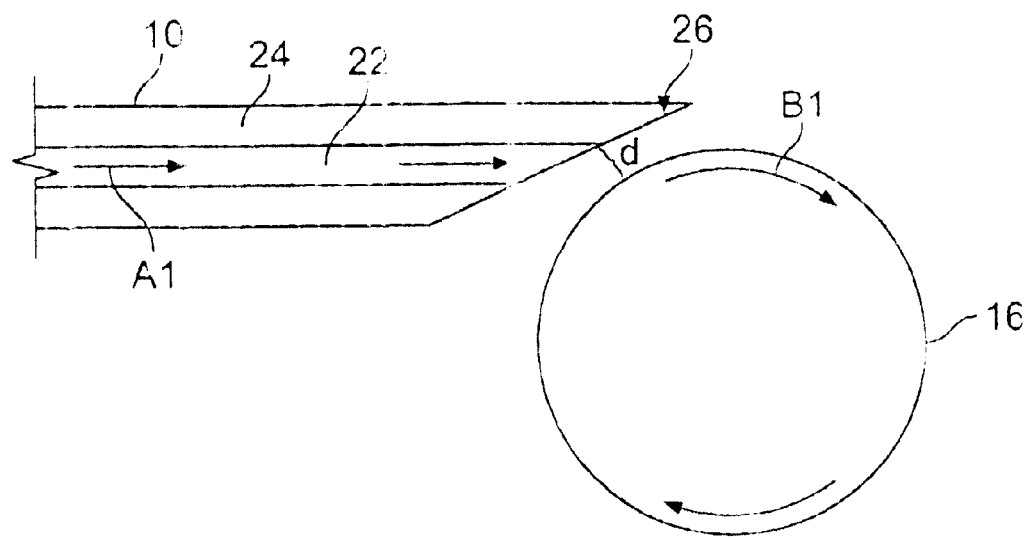
FIG. 1(a) is a cross-sectional view of an optical fiber coupler and cylindrical or spherical optical resonator.
Figure 1B:
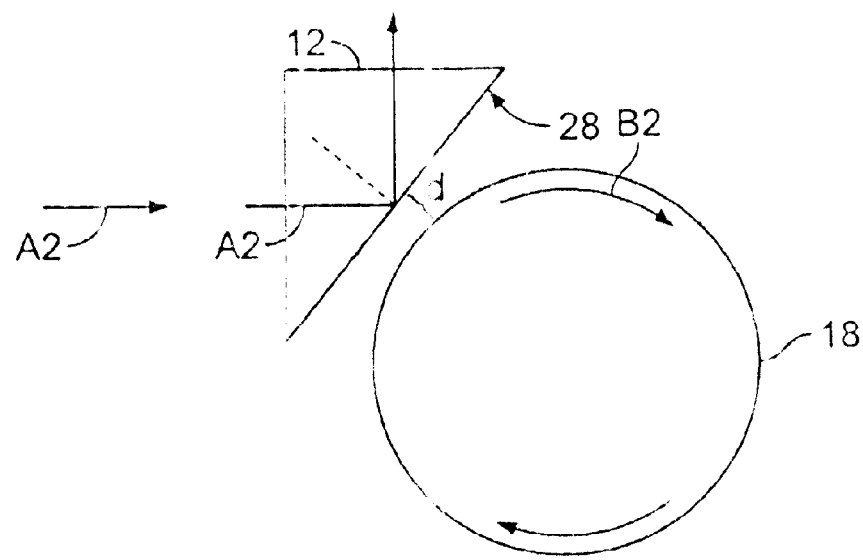
FIG. 1(b) is a cross-sectional view of a prism coupler and cylindrical or spherical optical resonator.
Figure 1C:
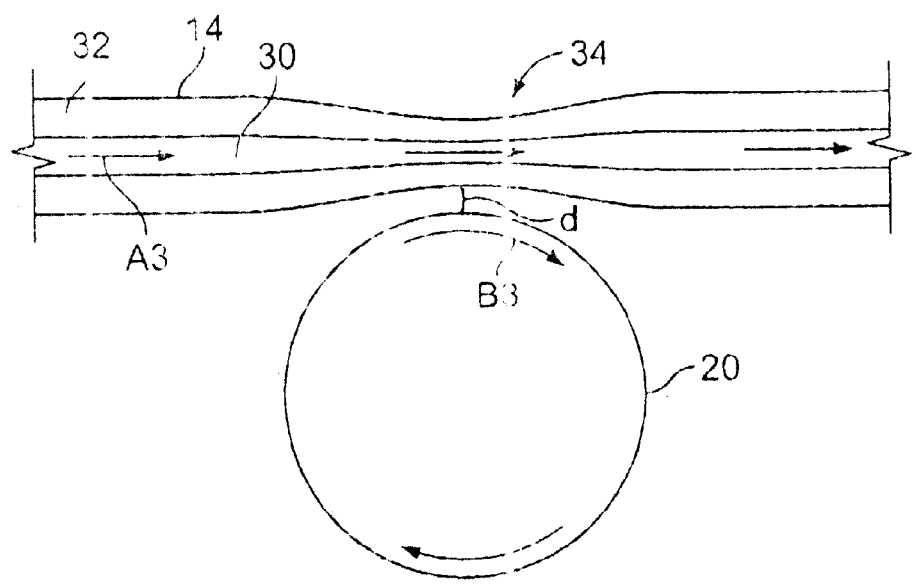
FIG. 1(c) is a cross-sectional view of a tapered optical fiber coupler and a cylindrical or spherical optical resonator.
Figure 2A:
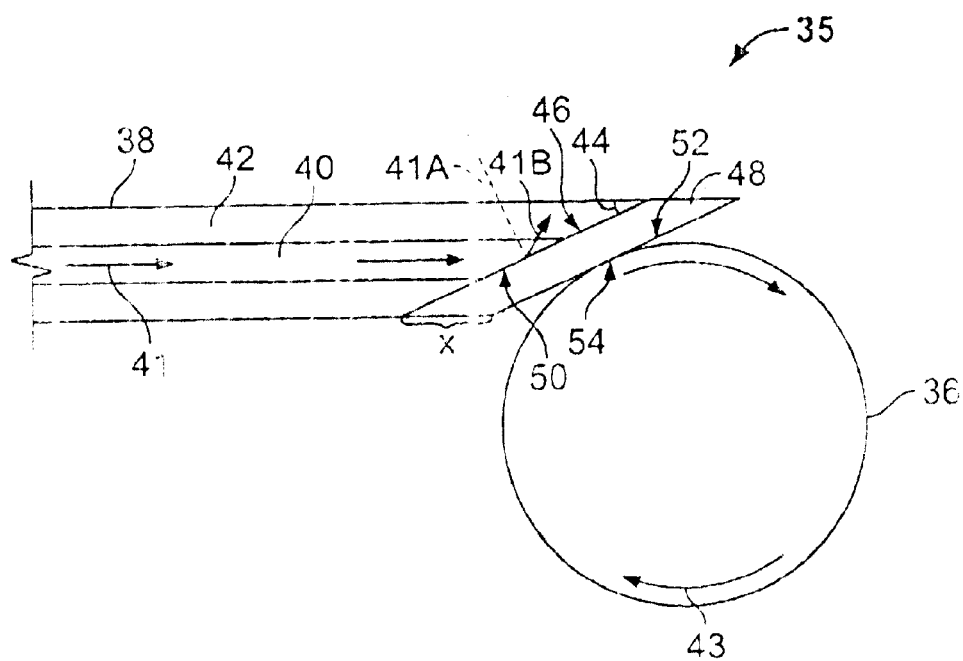
FIG. 2(a) is a cross-sectional view of an optical fiber coupler, film, and cylindrical or spherical optical resonator in accordance with an exemplary embodiment of the present invention.

FIG. 2(a) is a cross-sectional view, not shown to scale, of one exemplary embodiment of the present invention that includes a system 35 having cylindrical or spherical optical resonator 36 and an optical fiber coupler 38. While the optical resonator and optical fiber coupler can be made from various materials, in the present embodiment, the optical resonator is made of fused silica having an index of refraction of approximately 1.46. Also, the optical fiber coupler, for example, SMF-28 manufactured by Corning Incorporated of Corning, N.Y., includes both a core 40, for example, made of germanium-doped fused silica, having a refractive index of approximately 1.468 at a wavelength of 1550 nanometers and a cladding layer 42, for example, made of fused silica, having a refractive index of approximately 0.36% less than the core. The end of the optical fiber coupler closest to the optical resonator 36 has been ground to an acute angle 44 of approximately 6.5° and then polished resulting in a flat coupler surface 46. As a result of the acute angle, the length of the flat coupler surface 46 is approximately 1 millimeter even though the outside diameter of the optical fiber is merely 125 micrometers.

A film 48 having a thickness "t" is deposited by means of a vacuum deposition process on the flat coupler surface 46 of the optical fiber coupler 38. The film 48 also may be deposited on the coupler surface 46 by other means such as liquid deposition with subsequent drying and/or polymerization of the film. The thickness of the film 48 is on the order of hundreds of nanometers, roughly on the order of the wavelength of the light to be coupled into or out from the optical resonator 36. Typically, the film thickness ranges from about 0.1 to about 3 times the wavelength of the light. The film includes two sides 50 and 52. The side 52 of the film not in contact with the flat surface of the optical fiber coupler is adjacent to, and contacts the surface 54 of the optical resonator in the vicinity of a point on the film co-linear with the optical axis of the core 40. Thus, the film functions as a spacer between the optical fiber coupler 38 and the optical resonator 36.

The value of the refractive index for the film 48 is selected to allow for total internal reflection at the interface between the optical fiber coupler 38 and the film. In the present embodiment, since the optical resonator has a refractive index of approximately 1.46 and the core 40 of the optical fiber coupler has a refractive index of approximately 1.468, the film's refractive index can range from about 1.0 to 1.458 when the acute angle 44 is approximately 6.5°. Thus, the film may be fabricated from various materials including, e.g., Magnesium Fluoride ($MgF_2$) which has a refractive index of 1.38, TEFLON which has a refractive index of 1.39, of NAVITAR FIBERCOAT QLI, manufactured by Navitar Coating Labs of Newport Beach, Calif., which has a refractive index of 1.4. In the present embodiment, NAVITAR FIBERCOAT QLI was selected as the film material.

In operation, as shown in FIG. 2(a), light to be evanescently coupled from the optical fiber coupler 38 into the optical resonator 36 propagates along the optical axis of the core 40, in the direction of the straight arrows 41, until it encounters the side 50 of the film 48 in contact with the flat coupler surface 46, at which point, the light is total internally reflected relative to a perpendicular 41A to the side 50 of the film as indicated by the arrow 41B. An evanescent component of the light evanescently penetrates through the film to the other side 52 of the film that contacts the optical resonator. Ultimately, an evanescent component of the light is coupled into the optical resonator. The light is then internally reflected at the surface 54 of the optical resonator as it propagates through the optical resonator near its outer surface as indicated by the curved arrows 43.

Figure 2B:
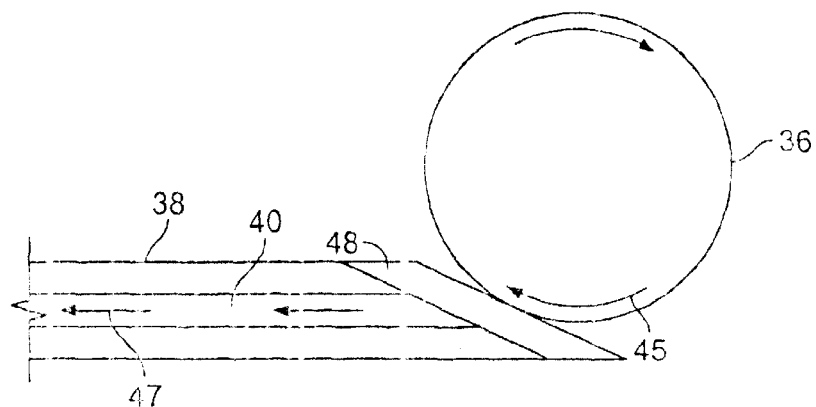
FIG. 2(b) is a cross-sectional view of an optical fiber coupler, film, and cylindrical or spherical optical resonator in accordance with an exemplary embodiment of the present invention.

FIG. 2(b) shows another exemplary embodiment of the present invention in which, rather than evanescently coupling light from the optical fiber coupler 38 into the optical resonator 36, light is evanescently coupled from the optical resonator 36 into the optical fiber coupler 38. A portion of the light previously propagating through the optical resonator as indicated by the direction of the curved arrows 45 is evanescently coupled through the film 48 at or near the film's point of contact with the optical resonator. Next, the light evanescently penetrates through the film, with a portion of the light propagating into and through the core 40 of the optical fiber coupler as indicated by the straight arrows 47.

During experimental testing, the thickness of the NAVITAR FIBERCOAT QLI film 48 deposited on the flat coupler surface 46 of optical fiber coupler 38 having an outside cladding diameter of 125 micrometers was varied. Then, the flat coupler surface 46 of the film was placed in contact with an optical resonator 36 made of fused silica having a diameter of 1 millimeter. Considering that the wavelength of light propagating through the optical fiber coupler was approximately 1.5 micrometers, it was hoped that the thickness of the film could be varied from approximately 0.5 to 2.0 micrometers. FIG. 3 shows the results of the experimental testing.

Figure 3A:
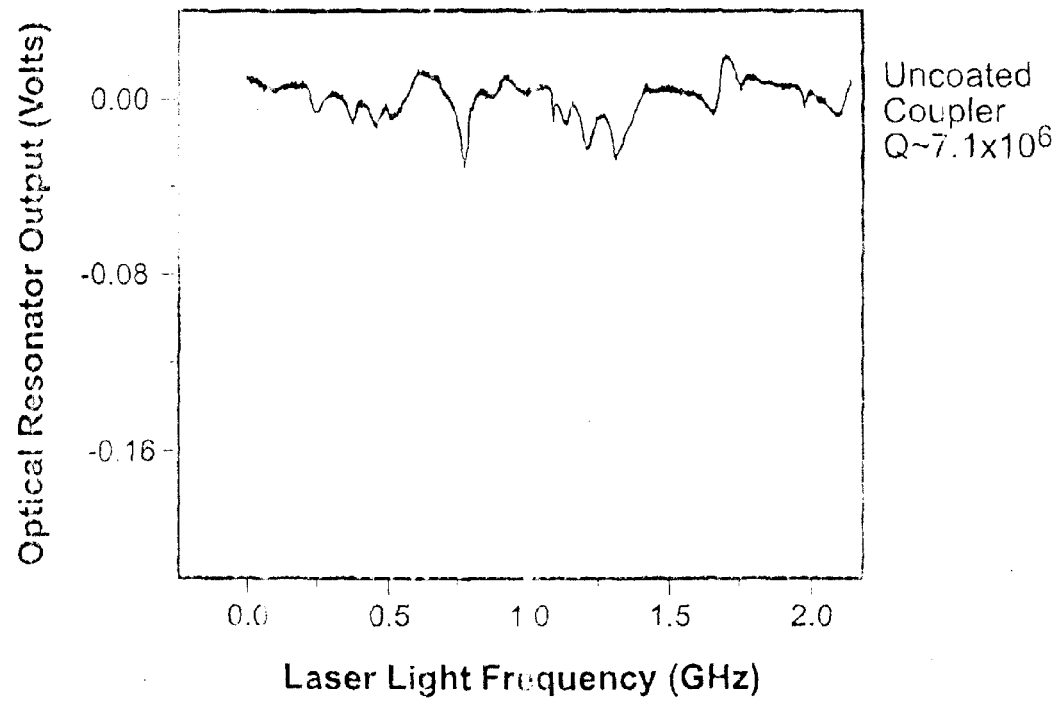
FIG. 3(a) is a graph of optical resonator output as a function of laser light frequency for an optical fiber coupler in contact with a 1 millimeter diameter fused silica spherical optical resonator.
Figure 3B:
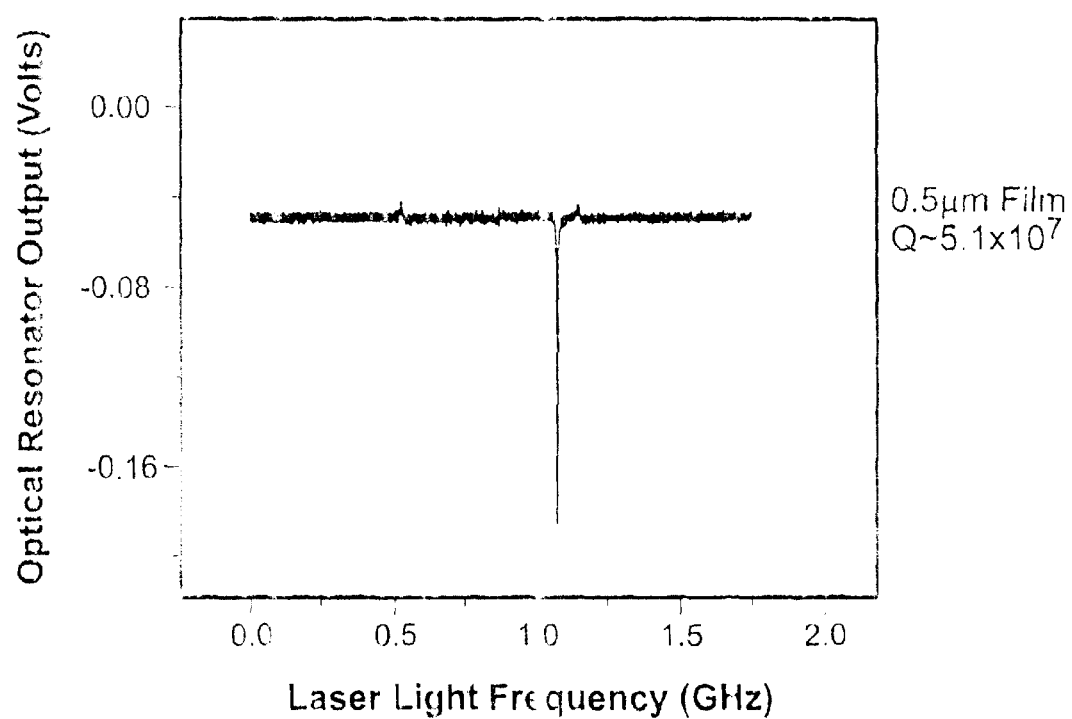
FIG. 3(b) is a graph of optical resonator output as a function of laser light frequency for an optical fiber coupler having a 0.5 micrometer film contacting a 1 millimeter diameter fused silica spherical optical resonator in accordance with an exemplary embodiment of the present invention.
Figure 3C:
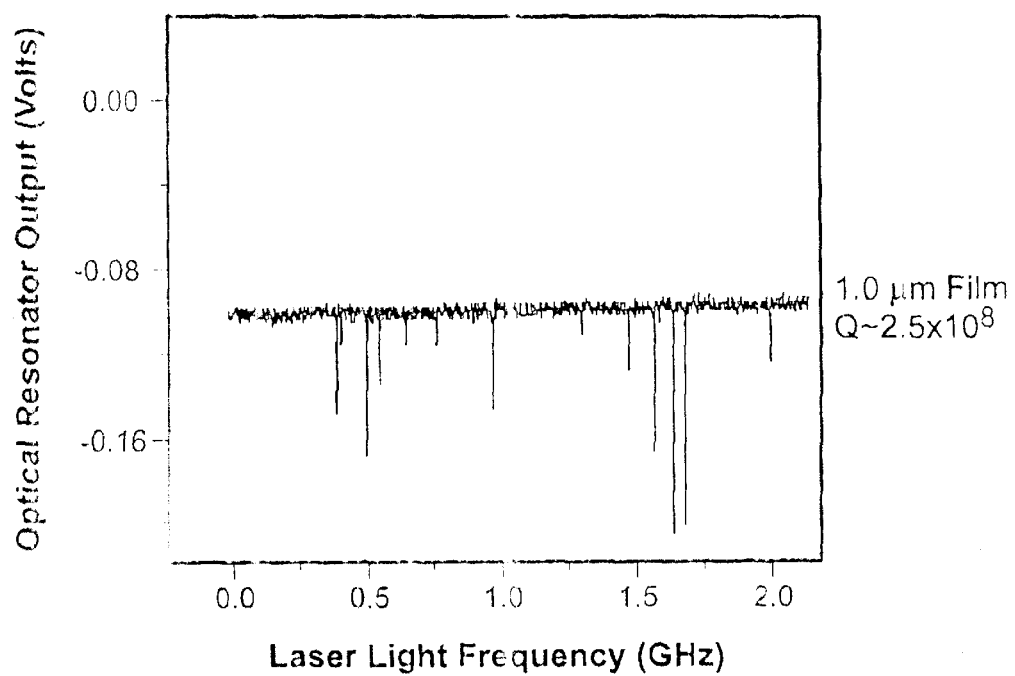
FIG. 3(c) is a graph of optical resonator output as a function of laser light frequency for an optical fiber coupler having a 1.0 micrometer film contacting a 1 millimeter diameter fused silica spherical optical resonator in accordance with an exemplary embodiment of the present invention.
Figure 4:
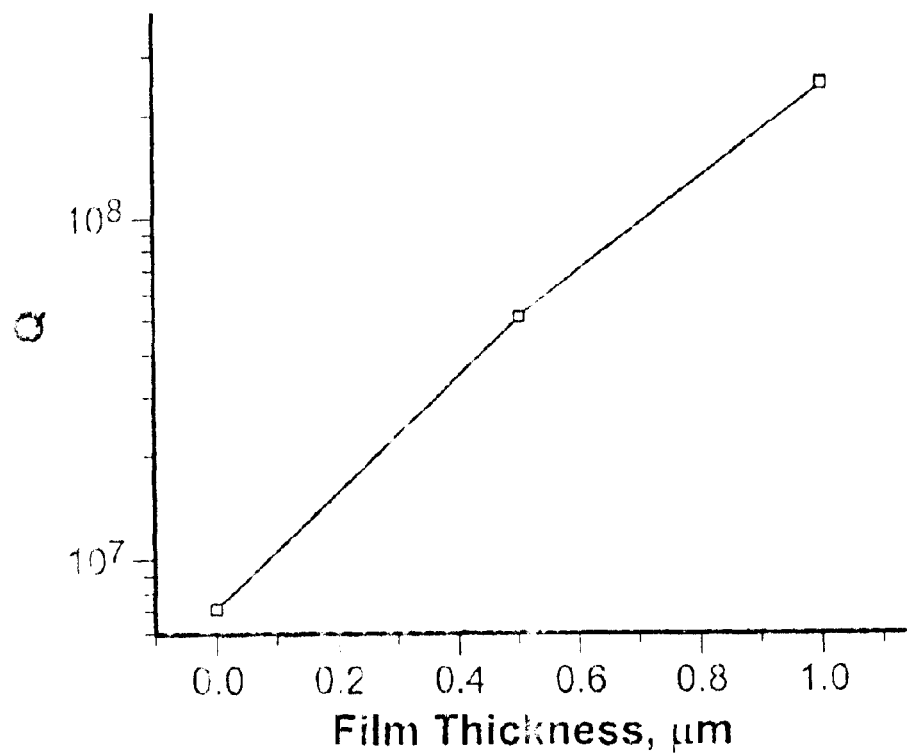
FIG. 4 is a graph of Q as a function of film thickness in accordance with exemplary embodiments of the present invention.

In FIG. 3, the optical resonator output in volts measured by a photodetector (not shown) as a function of laser light frequency is plotted for three different experimental cases. In the first case, see FIG. 3(a), no NAVITAR FIBERCOAT QLI film 48 was deposited on the flat coupler surface 46 of the optical fiber coupler 38. The flat coupler surface of the optical fiber coupler was placed in contact with the optical resonator resulting in a Q of approximately $7.1 \times 10^6$. In the second case, see FIG. 3(b), a NAVITAR FIBERCOAT QLI film having a thickness of 0.5 micrometers was placed in contact with the optical resonator resulting in a Q of approximately $5.1 \times 10^7$. In the third case, see FIG. 3(c), a NAVITAR FIBERCOAT QLI film having a thickness of 1.0 micrometer was placed in contact with the optical resonator resulting in a Q of approximately $2.5 \times 10^8$. The corresponding NAVITAR FIBERCOAT QLI film thickness and Q values for the three experimental cases were compiled into the graph of FIG. 4 which shows the relative increase in Q as a function of increasing film thickness.

During experimentation, efforts were made to increase the thickness of the NAVITAR FIBERCOAT QLI film beyond 1.0 micrometers. However, portions of the film began to separate from the rest of the film due to strain resulting from internal forces within the film. Thus, FIGS. 3 and 4 do not include data corresponding to a film thickness greater than 1.0 micrometer.

Figure 5A:
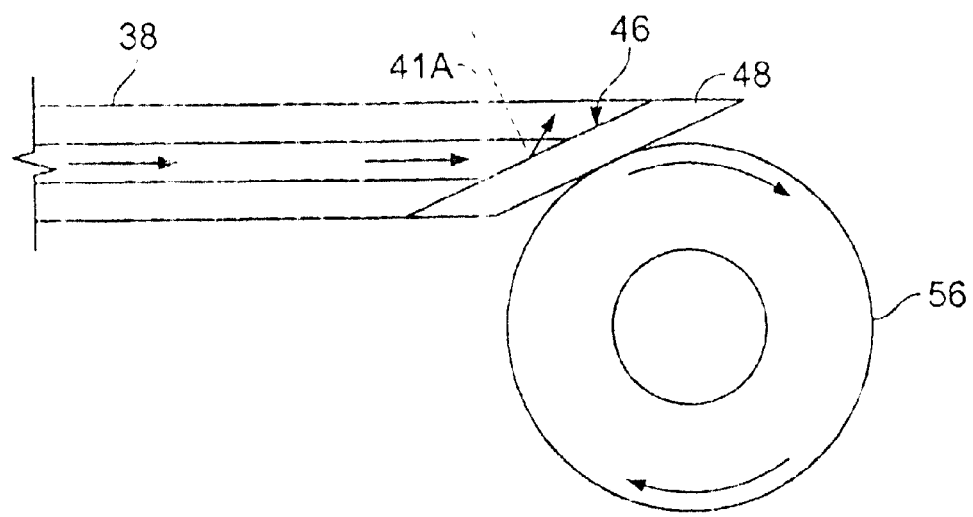
FIG. 5(a) is a cross-sectional view of an optical fiber coupler, film, and toroidal optical resonator in accordance with an exemplary embodiment of the present invention.
Figure 5B:
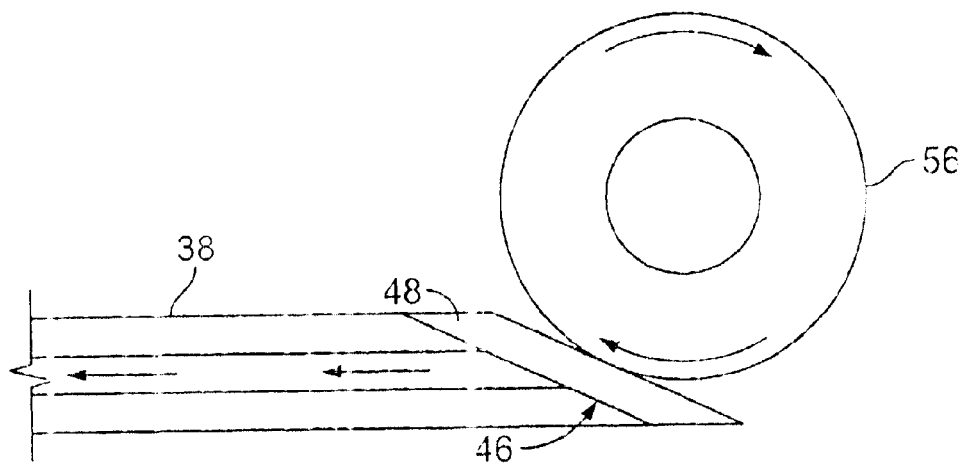
FIG. 5(b) is a cross-sectional view of an optical fiber coupler, film, and toroidal optical resonator in accordance with an exemplary embodiment of the present invention.

As mentioned previously, the optical resonator 36 can take various forms including that of a sphere, a cylinder, and a toroid. FIGS. 5(a) and 5(b), analogous to FIGS. 2(a) and 2(b), provide cross-sectional views, not shown to scale, of other exemplary embodiments of the present invention including an optical fiber coupler 38 having a film 48 deposited on a flat coupler surface 46 wherein the film contacts an optical resonator 56 that is toroidal in shape. The operation of the toroidal optical resonators of FIGS. 5(a) and 5(b) are analogous to the previously discussed cylindrical or spherical resonator of FIGS. 2(a) and 2(b), respectively.

Figure 6:
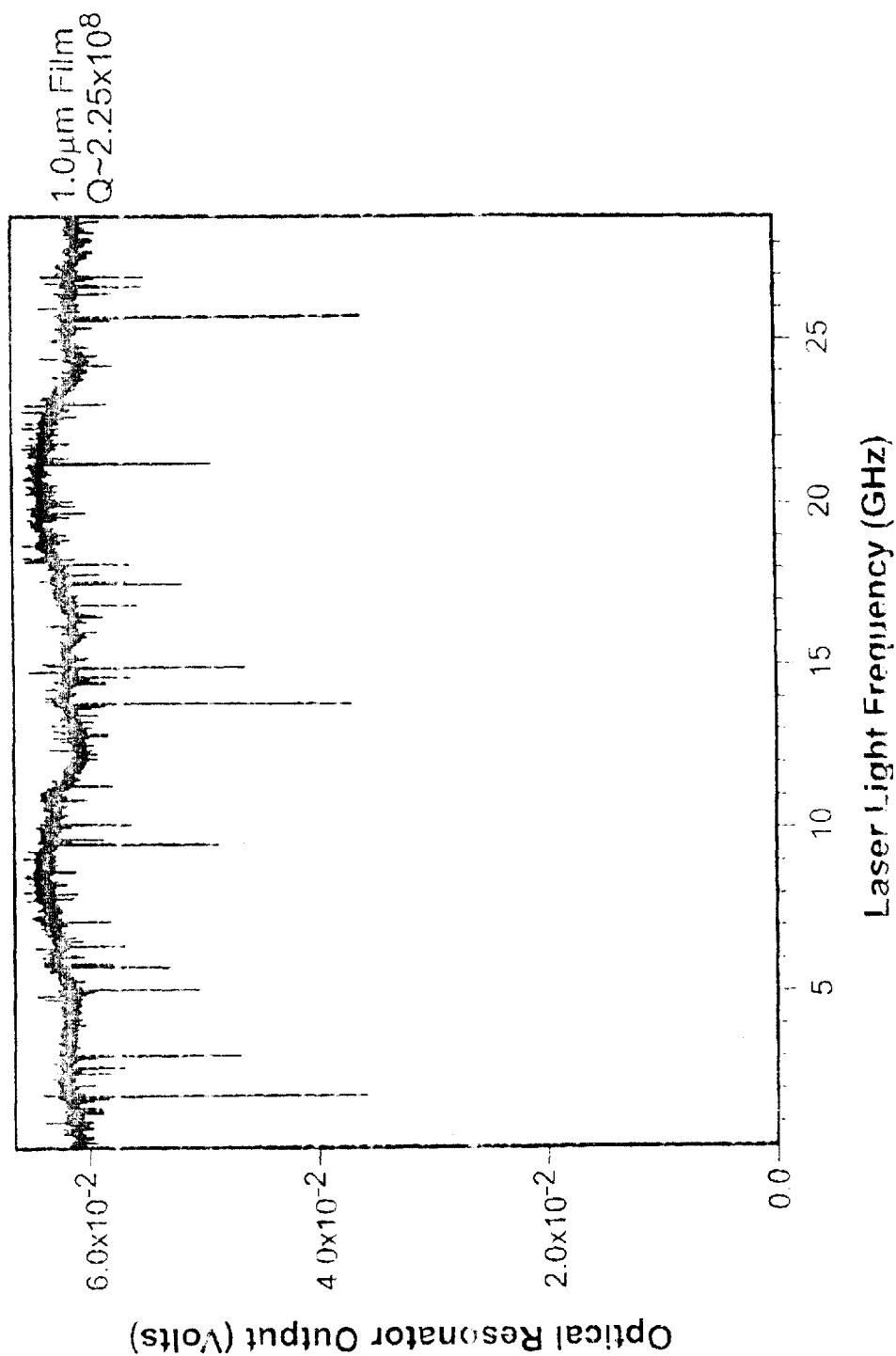
FIG. 6 is a graph of optical resonator output as a function of laser light frequency for an optical fiber coupler having a 1.0 micrometer film contacting a 6 millimeter diameter fused silica toroidal optical resonator in accordance with an exemplary embodiment of the present invention.

FIG. 6 is a plot of experimental tests performed using a toroidal optical resonator 56. FIG. 6 shows resonant cavity output in volts measured by a photodetector (not shown) as a function of laser light frequency for a toroidal optical resonator made of fused silica and having an outside diameter of 6 millimeters. The NAVITAR FIBERCOAT QLI film 48 thickness deposited on the flat coupler surface 46 of the optical fiber coupler 38 was 1.0 micrometer. Again, the diameter of the optical fiber coupler was 125 micrometers. During testing, the film was placed in contact with the toroidal optical resonator as shown in FIG. 5(a). The resulting Q of the toroidal optical resonator was approximately $2.25 \times 10^8$. FIG. 6 indicates the optical resonator output was relatively flat or even as a function of laser light frequency.

Figure 7A:
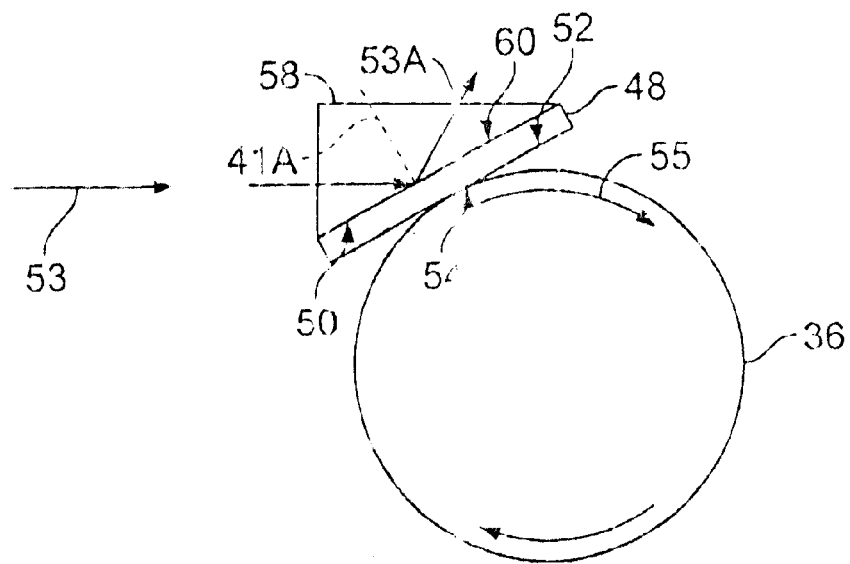
FIG. 7(a) is a cross-sectional view of a prism coupler, film, and cylindrical or spherical optical resonator in accordance with an exemplary embodiment of the present invention.
Figure 7B:
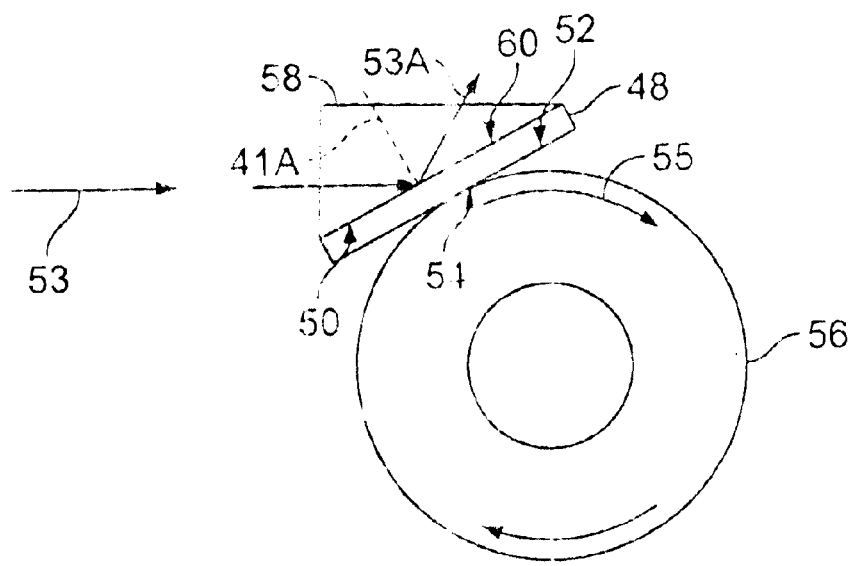
FIG. 7(b) is a cross-sectional view of a prism coupler, film, and toroidal optical resonator in accordance with an exemplary embodiment of the present invention.

Referring additionally to FIGS. 7 and 8, a film 48 can be deposited on the coupler surface of other types of optical couplers besides optical fiber couplers 38. In particular, FIG. 7 shows a cross-sectional view, not shown to scale, of another exemplary embodiment of the present invention employing a prism coupler 58 which has a film deposited on the coupler surface 60 of the prism coupler that is in close proximity to either a spherical or cylindrical optical resonator 36, see FIG. 7(a), or a toroidal optical resonator 56, see FIG. 7(b). The film includes two sides 50 and 52. In both FIGS. 7(a) and 7(b), the side 52 of the film not in contact with the prism coupler contacts the surface 54 of the optical resonator. In operation, FIGS. 7(a) and 7(b) show light propagating into the prism as indicated by the straight arrows 53, the light 53a total internally reflecting away from the coupler surface 60 in contact with the film, and an evanescent component of the light penetrating through the film and evanescently coupling into the optical resonator where the light travels around the perimeter of the optical resonator as indicated by the curved arrows 55. While not shown, a prism coupler, analogous to FIGS. 2(b) and 5(b), also can be used to evanescently couple light out from an optical resonator and into the prism coupler.

Figure 8A:
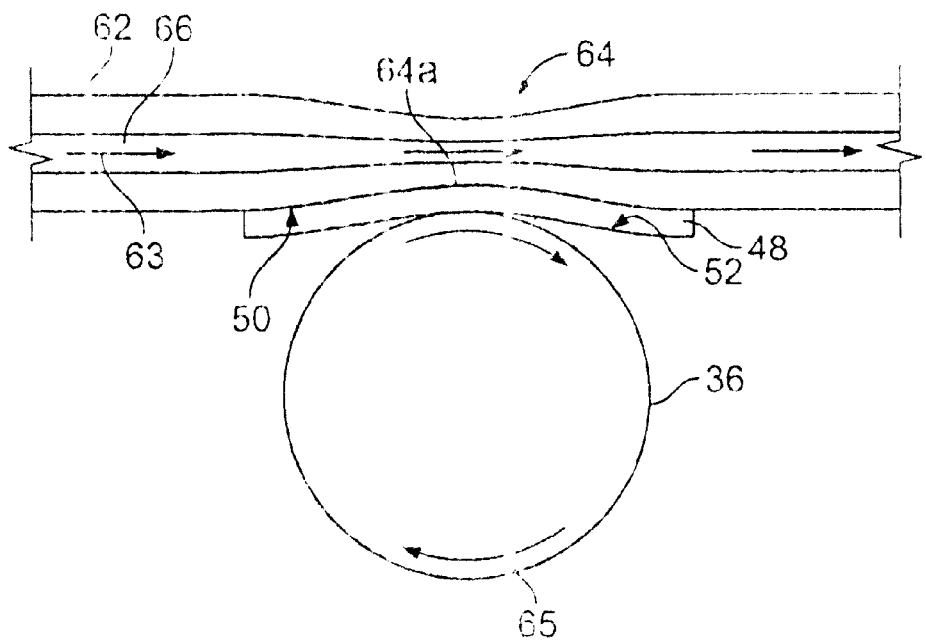
FIG. 8(a) is a cross-sectional view of a tapered optical fiber coupler, film, and cylindrical or spherical optical resonator in accordance with an exemplary embodiment of the present invention.
Figure 8B:
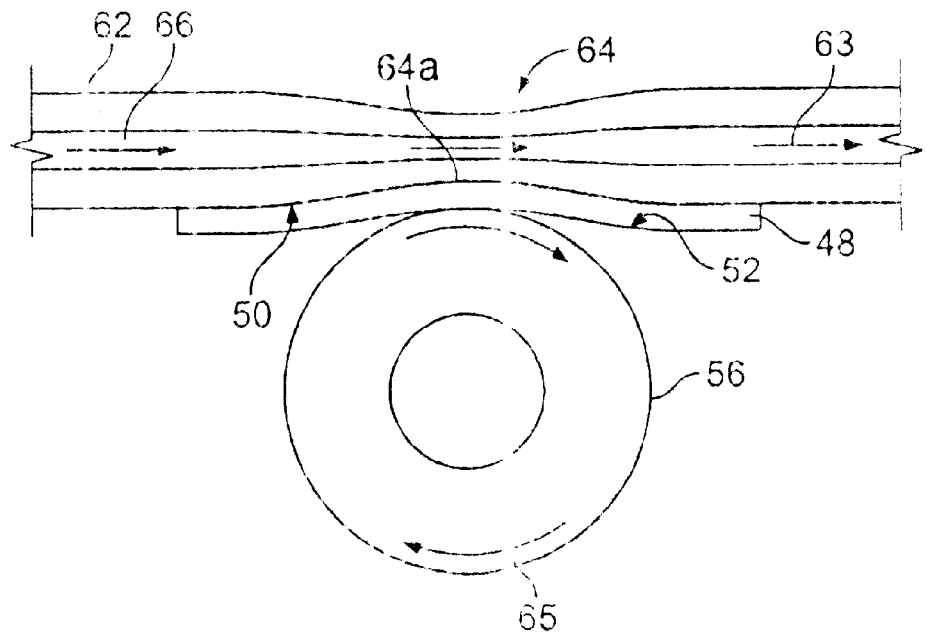
FIG. 8(b) is a cross-sectional view of a tapered optical fiber coupler, film, and toroidal optical resonator in accordance with an exemplary embodiment of the present invention.

FIG. 8 is a cross-sectional view, not shown to scale, of another exemplary embodiment of the present invention employing a tapered fiber coupler 62, which has a film 48 deposited on the inner surface 64a of the tapered coupler portion 64 of the tapered fiber coupler, in combination with a cylindrical or spherical optical resonator 36, see FIG. 8(a), or a torodial optical resonator 56, see FIG. 8(b). As shown in FIGS. 8(a) and 8(b), the film may be deposited only along a section 64a of the tapered coupler portion 64 to be positioned adjacent to the optical resonator, or while not shown, the film may be deposited around the entire outside surface of the tapered coupler portion 64. The film includes two sides 50 and 52. In both FIGS. 8(a) and 8(b), the side 52 of the film not in contact with tapered fiber coupler 62 contacts the surface of the optical resonator. In operation, FIGS. 8(a) and 8(b) show light 63 propagating along the core 66 of the tapered fiber coupler. The light is evanescently coupled from the tapered fiber coupler into the optical resonator where the light travels around the perimeter of the optical resonator as indicated by the curved arrows 65. While not shown, a tapered fiber optical coupler, analogous to FIGS. 2(b) and 5(b), also can be used to evanescently couple light out from an optical resonator and into the tapered fiber coupler.

For all of the previously discussed types of optical couplers, the optical couplers including deposition of the films may be mass-produced. For example, in the case of the optical fiber coupler 38, a batch of optical fibers can be securely positioned parallel to one another on a mounting pallet. The flat surface 46 for all of the optical fiber couplers can be ground and polished simultaneously. Also, the film 48 can be deposited on all of the fibers' flat coupler surfaces at the same time. Similarly, multiple prism couplers 58 and multiple tapered fiber couplers 62 including the film deposition step can be mass-produced. Thus, the present invention is conducive to mass production.

The present invention offers the advantage of optimal evanescent coupling of light from an optical coupler into an optical resonator and/or from an optical resonator into an optical coupler without adversely affecting the Q of the optical resonator, thus, simplifying the procedure for determining the spacing distance between the optical coupler and the optical resonator. As a result of the present invention, all that is needed is to place the side of the film that is not in contact with the optical coupler in contact with the resonator, leaving merely the step of aligning the optical axis of the optical coupler roughly tangential with the surface of the optical resonator. Also, the present invention is a passive system which, unlike piezo-positioners, assists in positioning an optical coupler relative to an optical resonator without the need for electrical systems. Therefore, the present invention, in addition to offering a solution to a standing problem, offers the advantages of ease of fabrication and a reduction in the number and type of alignment procedures, thus, lowering fabrication cost.

Although exemplary embodiments of the present invention have been described, they should not be construed to limit the scope of the appended claims. Those skilled in the art will understand that various modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A system comprising:
    an optical coupler having a coupler surface for evanescent coupling of light to or from an optical or electro-optical device; and
    a film connected to the coupler surface and configured to provide for total internal reflection of the light at an interface between the coupler surface and the film.

2. The system according to claim 1, wherein the optical coupler is an optical fiber coupler.

3. The system according to claim 1, wherein the optical coupler is a prism coupler.

4. The system according to claim 1, wherein the optical coupler is a tapered fiber coupler.

5. The system according to claim 1, further comprising:
    an optical whispering gallery mode resonator in contact with the film to be optically coupled with the optical coupler via the film.

6. A system comprising:
    an optical coupler having a coupler surface for evanescent coupling of light to or from an optical or electro-optical device; and
    a film connected to the coupler surface, wherein the film is selected from the group consisting of $M_gF_2$, TEFLON, and NAVITAR FIBERCOAT QLI.

7. The system according to claim 6, further comprising:
    an optical whispering gallery mode resonator in contact with the film to be optically coupled with the optical coupler via the film.

8. The system according to claim 7, wherein the optical coupler is an optical fiber coupler.

9. The system according to claim 7, wherein the optical coupler is a prism coupler.

10. The system according to claim 7, wherein the optical coupler is a tapered fiber coupler.

11. A system comprising:
    an optical coupler having a coupler surface for evanescent coupling of light to or from an optical or electro-optical device; and
    a film connected to the coupler surface, wherein light propagates through the optical coupler and the thickness of the film ranges in value from about 0.1 to about 3 times the wavelength of the light.

12. The system according to claim 11, further comprising:
    an optical whispering gallery mode resonator in contact with the film to be optically coupled with the optical coupler via the film.

13. The system according to claim 12, wherein the optical coupler is an optical fiber coupler.

14. The system according to claim 12, wherein the optical coupler is a prism coupler.

15. The system according to claim 12, wherein the optical coupler is a tapered fiber coupler.

16. A system comprising:
    an optical coupler having a coupler surface for evanescent coupling of light to or from an optical or electro-optical device; and
    a film connected to the coupler surface, wherein the film is deposited on the coupler surface by vapor deposition or liquid deposition with subsequent polymerization of the film.

17. The system according to claim 16, further comprising:
    an optical whispering gallery mode resonator in contact with the film to be optically coupled with the optical coupler via the film.

18. The system according to claim 17, wherein the optical coupler is an optical fiber coupler.

19. The system according to claim 17, wherein the optical coupler is a prism coupler.

20. The system according to claim 17, wherein the optical coupler is a tapered fiber coupler.

21. A system comprising:
    an optical coupler having a coupler surface;

a film connected to the coupler surface; and an optical resonator optically coupled to the film, wherein the film provides for total internal reflection of the light at an interface between the coupler surface and the film.

22. The system according to claim 21, wherein the film contacts the optical resonator.

23. The system according to claim 21, wherein the optical coupler is an optical fiber coupler.

24. The system according to claim 21, wherein the optical coupler is a prism coupler.

25. The system according to claim 21, wherein the optical coupler is a tapered fiber coupler.

26. The system according to claim 21, wherein the film is deposited on the coupler surface.

27. The system according to claim 21, wherein the optical resonator is cylindrical.

28. The system according to claim 21, wherein the optical resonator is spherical.

29. The system according to claim 28, wherein the optical resonator has a Q greater than $1 \times 10^7$.

30. The system according to claim 21, wherein the optical resonator is toroidal.

31. The system according to claim 30, wherein the optical resonator has a Q greater than $1 \times 10^7$.

32. The system according to claim 21, wherein the optical resonator is made from fused silica.

33. The system according to claim 21, wherein the optical resonator is a whispering-gallery mode resonator that is in contact with the film.

34. A system comprising:
an optical coupler having a coupler surface;
a film connected to the coupler surface; and
an optical resonator optically coupled to the film, wherein the film is selected from the group consisting of $M_gF_2$, TEFLON, and NAVITAR FIBERCOAT QLI.

35. The system according to claim 34, wherein the optical resonator is an optical whispering gallery mode resonator that is in contact with the film.

36. The system according to claim 35, wherein the optical coupler is an optical fiber coupler.

37. The system according to claim 35, wherein the optical coupler is a prism coupler.

38. The system according to claim 35, wherein the optical coupler is a tapered fiber coupler.

39. A system comprising:
an optical coupler having a coupler surface;
a film connected to the coupler surface; and
an optical resonator optically coupled to the film, wherein light propagates through the optical coupler and the thickness of the film ranges in value from about 0.1 to about 3 times the wavelength of the light.

40. The system according to claim 39, wherein the wavelength of the light is approximately 1.5 micrometers and the thickness of the film ranges in value from approximately 0.5 micrometers to less than 2.0 micrometers.

41. The system according to claim 39, wherein the optical resonator is an optical whispering gallery mode resonator that is in contact with the film.

42. The system according to claim 41, wherein the optical coupler is an optical fiber coupler.

43. The system according to claim 41, wherein the optical coupler is a prism coupler.

44. The system according to claim 41, wherein the optical coupler is a tapered fiber coupler.

45. A system comprising:
an optical coupler having a coupler surface;

a film deposited on the coupler surface; and an optical resonator optically coupled to the film, wherein the film is deposited on the coupler surface by vapor deposition or liquid deposition with subsequent polymerization of the film.

46. The system according to claim 45, wherein the optical resonator is an optical whispering gallery mode resonator that is in contact with the film.

47. The system according to claim 46, wherein the optical coupler is an optical fiber coupler.

48. The system according to claim 46, wherein the optical coupler is a prime coupler.

49. The system according to claim 46, wherein the optical coupler is a tapered fiber coupler.

50. A method of coupling light, the method comprising:
propagating light through an optical coupler having a coupler surface; and
evanescently coupling light through a film connected to and in contact with the coupler surface and into an optical or electro-optical device in contact with the film, wherein the thickness of the film ranges in value from about 0.1 to about 3 times the wavelength of the light.

51. The method according to claim 50, wherein the film is selected from the group consisting of MgF2, TEFLON, and NAVITAR FIBERCOAT QLI.

52. The method according to claim 50, wherein the optical or electro-optical device is an optical resonator.

53. The method according to claim 52, wherein the optical resonator is a whispering-gallery mode resonator.

54. The method according to claim 50, wherein the film is deposited on the coupler surface by vapor deposition or liquid deposition with subsequent polymerization of the film.

55. A system, comprising:
an optical whispering gallery mode resonator;
a film spacer having a first surface in contact with the resonator and a second surface, the film spacer having a thickness between the first and the second surface to allow an evanescent field of the resonator to be present at the second surface; and
an optical coupler in contact with the second surface of the film spacer and optically evanescently coupled to the resonator,
wherein the film spacer has a refractive index less than a refractive index of the resonator and is configured to provide for total internal reflection of the light at an interface between the optical coupler and the film spacer.

56. A system as in claim 55, wherein the film spacer is a film deposited on the optical coupler by vapor deposition or liquid deposition with subsequent polymerization of the film.

57. A system as in claim 55, wherein the thickness of the film spacer ranges in value from about 0.1 to about 3 times the wavelength of light coupled between the resonator and the optical coupler.

58. A system as in claim 55, wherein the film spacer has a material selected from a group consisting of $MgF_2$, TEFLON, and NAVITAR FIBERCOAT QLI.

59. A system as in claim 55, wherein the optical coupler is an optical fiber coupler.

60. A system as in claim 55, wherein the optical coupler is a prism coupler.

61. A system as in claim 55, wherein the optical coupler is a tapered fiber coupler which has a tapered section in contact with the second surface of the film spacer.

62. A system as in claim 55, wherein the optical resonator is cylindrical.

63. A system as in claim 55, wherein the optical resonator is spherical.

64. A system as in claim 55, wherein the optical resonator is toroidal.

* * * * *